United States Patent [19]
Matsui

[11] Patent Number: 6,163,804
[45] Date of Patent: Dec. 19, 2000

[54] NETWORK INFORMATION SEARCHING APPARATUS AND NETWORK INFORMATION SEARCHING METHOD

[75] Inventor: Hiroshi Matsui, Tokyo, Japan

[73] Assignee: Canon Kabushiki Kaisha, Tokyo, Japan

[21] Appl. No.: 09/110,027

[22] Filed: Jul. 2, 1998

[30] Foreign Application Priority Data

Jul. 8, 1997 [JP] Japan .................................. 9-196433

[51] Int. Cl.⁷ .................................................. G06F 15/16
[52] U.S. Cl. ............................................................. 709/219
[58] Field of Search .............................. 707/5; 709/201, 709/202, 203, 217, 218, 219, 213

[56] References Cited

U.S. PATENT DOCUMENTS

| | | | |
|---|---|---|---|
| 5,659,732 | 8/1997 | Kirsch | 707/5 |
| 5,717,913 | 2/1998 | Driscoll | 707/5 |
| 5,768,508 | 6/1998 | Eikeland | 709/202 |
| 5,802,292 | 9/1998 | Mogul | 709/203 |
| 5,893,091 | 4/1999 | Hunt et al. | 709/218 X |
| 5,931,907 | 8/1999 | Davies et al. | 709/219 |

FOREIGN PATENT DOCUMENTS

| | | |
|---|---|---|
| 2314178 | 12/1997 | United Kingdom . |
| WO 96/23265 A1 | 8/1996 | WIPO . |
| WO 97/39412 A1 | 10/1997 | WIPO . |
| 97/44747 | 11/1997 | WIPO . |

OTHER PUBLICATIONS

"EchoSearch: a tool with smarts", Wildstrom S H, at http://www.businessweek.com/1996/40/b349539.htm, updated Jun. 14, 1997.

Chris Dodge et al., Web Cataloguing through cache exploitation and steps toward consistency maintenance, Dec. 1995, pp. 1003–1008.

Evangelos P. Markatos et al., A Top–10 Approach to Prefetching on the Web, ICS–FORTH, http://www.ics.forth.gr, Aug. 1996, pp. 1–15.

*Primary Examiner*—Zarni Maung
*Assistant Examiner*—Patrice Winder
*Attorney, Agent, or Firm*—Fitzpatrick, Cella, Harper & Scinto

[57] ABSTRACT

A collecting process of data which is managed by each server on a network is first started by information collection means. Data collected by the information collection means is stored in an information holding means. Subsequently, the data which is needed by a user is extracted by extraction means. Then, the extracted data is outputted to an output destination. In one embodiment, data under a point serving as the root is collected while repeating processes. Such that data at the point serving as a certain root is collected on the basis of access setting information; a link destination is extracted from the collected data and data on the extracted link is further collected. In another embodiment, the data type held in the information holding means is analyzed, then is compared with the data type required by the user by the extraction means. Thus, the data is extracted by extraction means in accordance with the result of the comparison.

37 Claims, 13 Drawing Sheets

FIG. 2

| START | | | END | | TIMER SETTING | TIMEOUT | NUMBER OF TIMES OF RETRY | TRANSFER AMOUNT | NUMBER OF SESSIONS |
|---|---|---|---|---|---|---|---|---|---|
| DATE | DAY OF WEEK | TIME 3:00 | DATE | DAY OF WEEK | TIME | | | | |

FIG. 3

| ACCESS SETTING | SETTING 1 | SETTING 2 | SETTING 3 | SETTING 4 |
|---|---|---|---|---|
| SERVER ADDRESS | www | www | www | mail.or.jp |
| SERVER CLASSIFICATION | | | | MAIL |
| URL | URL OF PAGE 702 | www.b.co.jp | www.8101.co.jp | |
| HIERARCHICAL LAYER | 3 | 3 | 3 | |
| MAIL ADDRESS | | | | aa@mail.or.jp |
| DIRECTORY | | | | |
| USER ID | | | | |
| PASSWORD | | | | |
| DIRECTIVITY COLLECTION | NO | NO | NO | NO |
| DIRECTIVITY COLLECTION LAYER | | | | |

FIG. 4

| EXTRACTION CONDITION No. | 1 | 2 | 3 | 4 | 5 | 6 |
|---|---|---|---|---|---|---|
| ACCESS SETTING No. | 1 | 2 | 1 | 1 | 3 | 4 |
| SEARCH EXTRACTION | YES | NO | NO | NO | YES | NO |
| SYNONYM EXTRACTION | NO | NO | NO | NO | YES | NO |
| ANALOGUE EXTRACTION | NO | NO | — | — | YES | NO |
| SEARCH OBJECT | ALL | — | — | — | ALL | — |
| SEARCH CONDITION 1 | PRINTING DEVICE | — | — | — | CANON | — |
| ⋮ | | | | | | |
| SEARCH CONDITION n | — | — | — | — | — | — |
| DATA TYPE EXTRACTION | NO | NO | NO | NO | NO | NO |
| DATA TYPE 1 | — | — | — | — | — | — |
| ⋮ | | | | | | |
| DATA TYPE n | — | — | — | — | — | — |
| IMAGE EXTRACTION | NO | NO | NO | NO | NO | NO |
| IMAGE CONDITION 1 | — | — | — | — | — | — |
| ⋮ | | | | | | |
| IMAGE CONDITION n | — | — | — | — | — | — |
| OUTPUT DESTINATION DESIGNATION | STORAGE DEVICE | PRINTING DEVICE | MAIL | FAX | STORAGE DEVICE | PRINTING DEVICE |
| ADDRESS No. | | | 1 | 2 | | |
| EXTRA CONDITION DATA | | | 1 | 2 | | |

FIG. 5

| ADDRESS No. | MAIL ADDRESS | FAX No. |
|---|---|---|
| 1 | aaa@bbb.or.jp | |
| 2 | | 03-1234-1234 |
| 3 | | |
| | | |
| | | |

FIG. 6

| IMAGE CONDITION No. | IMAGE CHARACTERISTICS INFORMATION |
|---|---|
| 1 | IMAGE CHARACTERISTICS INFORMATION ON MAN |
| 2 | IMAGE CHARACTERISTICS INFORMATION ON MOUNTAIN |
| 3 | IMAGE CHARACTERISTICS INFORMATION ON SEA |
| | |
| | |
| | |
| | |
| | |
| | |

NETWORK INFORMATION SEARCHING APPARATUS AND NETWORK INFORMATION SEARCHING METHOD

BACKGROUND OF THE INVENTION

1. Field of the Invention

The invention relates to a network information searching apparatus which is connected to a plurality of information processing apparatuses on a network through the network and is used to search information required by the user from information managed and held in each of the information processing apparatuses and also relates to a method for such an apparatus.

2. Related Background Art

In case of searching desired information of the user from information managed and held by a plurality of computers on a network, it is necessary to repetitively execute an operation to obtain the information and an operation to confirm the contents of the obtained information until necessary information or information including the necessary information is obtained. That is, it is necessary to repetitively execute an operation for accessing from a computer of the user through the network to a server program operating on the computer connected to the network and for obtaining information in accordance with a procedure corresponding to the server program after accessing, an operation for reading the contents of the obtained information and confirming whether the necessary information is included in the information or not, and an operation for getting next information if the necessary information is not included in the obtained information.

In a case of searching necessary information from information of a page construction which is managed by a WWW (World Wide Web) system constructed by a WWW program operating on a computer connected to the internet and is logically linked by a URL (Uniform Resource Locator), the necessary information is searched by repeating operations such that the contents of an arbitrary page in information of the page construction managed are read, if the necessary information does not exist in the page, characters or a figure, namely, what is called an anchor concerned with a URL of a page which may include the necessary information at a page that is at present opened is clicked by a mouse, a corresponding next page is displayed, and the contents of this page are read.

An example of the operations in a case of searching necessary information from the information managed by the WWW system will now be described with reference to FIG. 14. FIG. 14 is a diagram for explaining the operation example in case of searching the necessary information from the information managed by the conventional WWW system.

For example, as shown in FIG. 14, the contents of an arbitrary page 8101 in information of a page construction managed by a plurality of WWW servers 81, 82, . . . , and 8n are read. If the necessary information does not exist in this page, characters or a figure, that is, an anchor 8101-1 here concerned with a URL which may include the necessary information at this page is clicked, so that a page 8102 is displayed. The user reads the contents of the page 8102. When the user confirms that the information which is needed by the user does not exist in the page 8102 in a manner similar to the above operation, characters or a figure concerned with the URL of the page which may include the necessary information is clicked by the mouse, thereby displaying the next page.

However, in a case of searching the necessary information from the information managed by the WWW system mentioned above, as characters or a figure concerned with the URL of the page which may include the necessary information at the page that is at present opened, the user may subjectively decide which characters or figure should be selected. The user cannot know the relations among the pages. Therefore, it is necessary to repeat the operations many times, and the user is forced to read unnecessary information other than the object for a period of time until the necessary information is searched. Much surplus labor and surplus working time are required for the operation by the page including the necessary information is found.

SUMMARY OF THE INVENTION

It is an object of the invention to provide a network information searching apparatus and a network information searching method which can search information required by the user from information managed and held in a plurality of information processing apparatuses on a network without requiring unnecessary labor and time to the user.

To accomplish the above object, according of the invention, there is provided a network information searching apparatus which is connected through a network to a plurality of information processing apparatuses on the network and is used to search information required by the user from information stored in each memory means in each of the information processing apparatuses, comprising:

information collection means for collecting the information stored in each of the memory means through the network;

information holding means for holding the information collected by the information collection means;

extraction means for extracting information corresponding to the information required by the user from the information held in the information holding means; and output means for outputting the information extracted by the extraction means and corresponding to the information required by the user.

To accomplish the above object, according to the invention, there is provided a network information searching method in a network information searching apparatus which is connected through a network to a plurality of information processing apparatuses on the network and is used to search information required by the user from information stored in each of the memory means in each of the information processing apparatuses, comprising:

an information collecting step of collecting the information stored in each of the memory means through the network;

an information holding step of holding the information collected by the information collecting step into information holing means;

an extracting step of extracting information corresponding to the information required by the user from the information held in the information holding means; and an output step of outputting the information extracted by the extracting step and corresponding to the information required by the user.

To accomplish the above object, according to the invention, there is provided a storage medium which is connected through a network to a plurality of information processing apparatuses on the network and in which a network information searching program to search information required by the user from information stored in each memory means in each of the information processing apparatuses has been stored, wherein the network information searching program comprises:

an information collecting module for collecting the information stored in each of the memory means through the network;

an information holding module for holding the collected information into information holding means;

an extracting module for extracting information corresponding to the information required by the user from the information held in the information holding means; and an output module for outputting the extracted information corresponding to the information required by the user.

To accomplish the above object, according to the invention, there is provided a network information searching system constructed by a plurality of information processing apparatuses and a network information searching apparatus which are mutually connected through a network, wherein the network information searching apparatus comprises:

information collection means for collecting the information stored in each of the memory means in each of the information processing apparatuses through the network;

information holding means for holding the information collected by the information collection means;

extraction means for extracting information corresponding to the information required by the user from the information held in the information holding means; and output means for outputting the information extracted by the extraction means and corresponding to the information required by the user.

BRIEF DESCRIPTION OF THE DRAWINGS

FIG. 2 is a diagram showing the contents of environment setting information which is used in the network information searching apparatus of FIG. 1;

FIG. 3 is a diagram showing the contents of access setting information which is used in the network information searching apparatus of FIG. 1;

FIG. 4 is a diagram showing the contents of extraction condition setting information which is used in the network information searching apparatus of FIG. 1;

FIG. 5 is a diagram showing the contents of address information which is used in the network information searching apparatus of FIG. 1;

FIG. 6 is a diagram showing the contents of image characteristics information which is used in the network information searching apparatus of FIG. 1;

DETAILED DESCRIPTION OF THE PREFERRED EMBODIMENTS

An embodiment of the invention will now be described hereinbelow with reference to the drawings.

Figure 1:
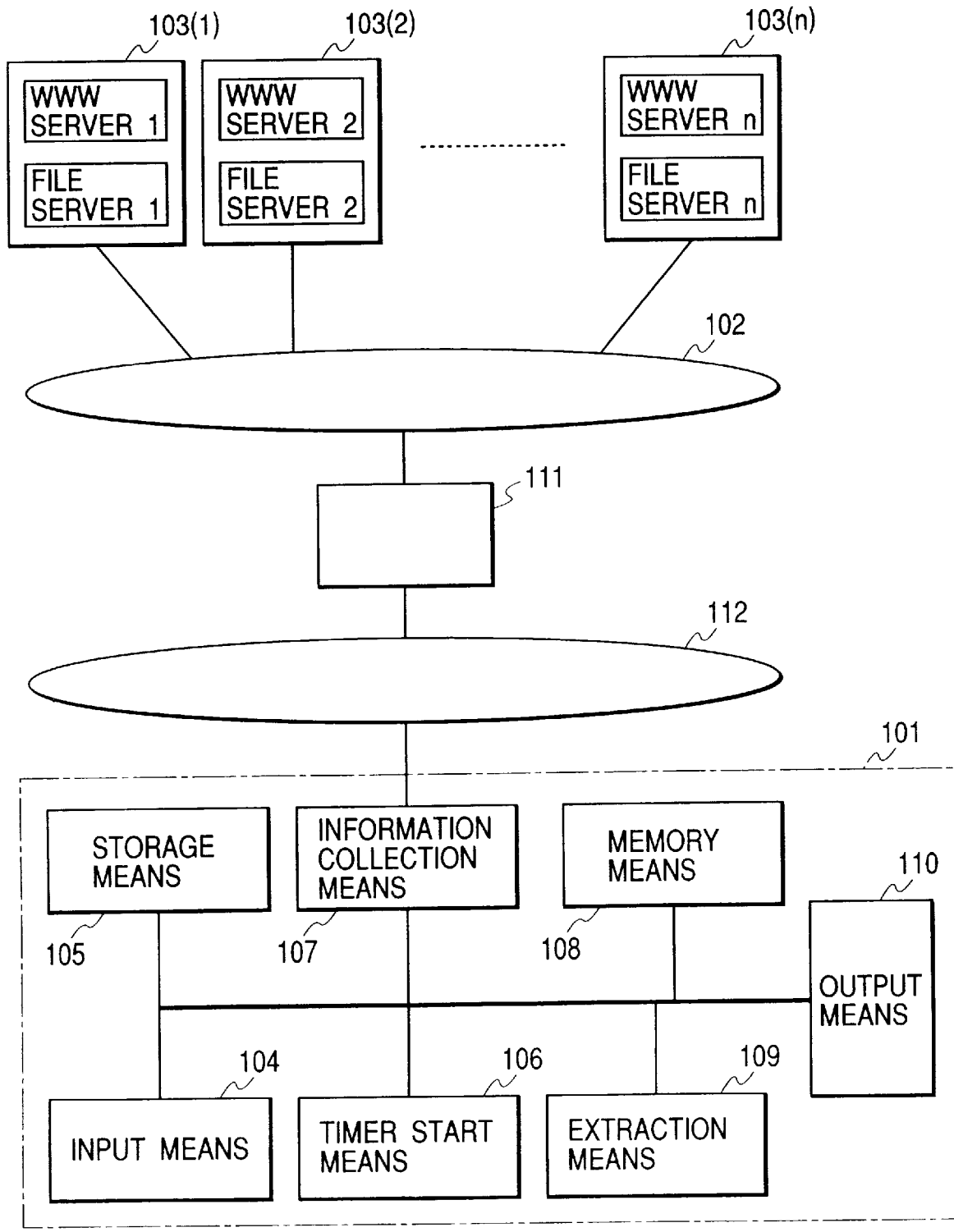
FIG. 1 is a block diagram showing a construction of an embodiment of a network information searching apparatus of the invention.

(a) First Embodiment:

FIG. 1 is a block diagram showing a construction of an embodiment of a network information searching apparatus of the invention.

As shown in FIG. 1, a plurality of server computers $103(m)$ $(m=1, 2, \ldots, n)$ are connected to an internet network (hereinafter, referred to as a network) 102. An information management system to manage holding information by server programs such as WWW server programs 1 to n, file server programs 1 to n, and the like is constructed in each of the server computers $103(m)$.

A network information searching apparatus 101 is used as an apparatus for searching information required by the user from the information held in each of the server computers $103(m)$. The apparatus 101 is connected to the network 102 through a public line 112 and a provider 111. The network information searching apparatus 101 comprises input means 104, storage means 105, timer start means 106, information collection means 107, memory means 108, extraction means 109, and output means 110.

The input means 104 inputs various information such as environment setting information, access setting information, extraction condition setting information, address information, extraction image information, and the like in accordance with the operation by the user. The inputted various information is stored into the storage means 105.

FIG. 2 is a diagram showing the contents of the environment setting information which is used in the network information searching apparatus of FIG. 1.

As shown in FIG. 2, in the environment setting information, there have been registered: a date, a day of the week, and time of "start"; a date, a day of the week, and time of "end"; a timer setting to set everyday, every week, or every month in case of periodically starting; a timeout of the connection; the number of times of retry; a transfer amount upon downloading; and the number of sessions which are simultaneously accessed.

FIG. 3 is a diagram showing the contents of the access setting information which is used in the network information searching apparatus of FIG. 1.

As shown in FIG. 3, in the access setting information, there have been registered: an access setting No.; an address of the server which is used; a classification of the server; a URL, serving as a root in a case of accessing to the WWW server; a hierarchical layer showing a depth of downloading; a mail address of the user in a case of accessing to a mail system; a directory serving as a root in case of accessing to a file server; a user ID; a password; a directivity collection to set whether the directivity collection is performed or not; and a hierarchical layer serving as a unit of discrimination about the directivity collection.

FIG. 4 is a diagram showing the contents of the extraction condition setting information which is used in the network information searching apparatus of FIG. 1.

As shown in FIG. 4, in the extraction condition setting information, there have been registered: an extraction condition setting No.; an access setting No. concerned with the access setting No. of the access setting information; a search extraction to set whether the extraction by the search is performed or not; a synonym extraction to set whether the extraction by a synonym is performed or not; an analogue extraction to set whether the extraction by an analogue is performed or not; a search object to designate a search object; search conditions 1 to n to set a search keyword and the like; a data type extraction to set whether the extraction by a data type is performed or not; data types 1 to n to designate a type of data to be extracted; an image extraction to set whether the extraction by characteristics of the image data is performed or not; image conditions 1 to n to designate characteristics of the image data to be extracted; an output destination designation to set an output destination; an address No. in case of outputting to a mail or FAX; and extra condition data to set whether the data which is not congruous with the extraction conditions is left or not.

FIG. 5 is a diagram showing the contents of the address information which is used in the network information searching apparatus of FIG. 1. FIG. 6 is a diagram showing the contents of the image characteristics information.

As shown in FIG. 5, a mail or an FAX telephone number of the address has been registered in the address information. As shown in FIG. 6, an image condition No. and image characteristics information have been registered in the image extraction information.

The information collection means 107 comprises means for accessing to the corresponding server computer (m) on the basis of the access setting information and collecting information held by each server computer (m) through the network 102. The information collected by the information collection means 107 is held in the memory means 108. The extraction means 109 extracts the information corresponding to the information required by the user on the basis of the extraction condition setting information set by the user from the information held in the memory means 108. The extracted information is outputted to the output destination designated by the output destination designation included in the extraction condition setting information by the output means 110. The timer start means 106 comprises means for starting the information collection means 107 on the basis of the information included in the environment setting information.

Figure 7:
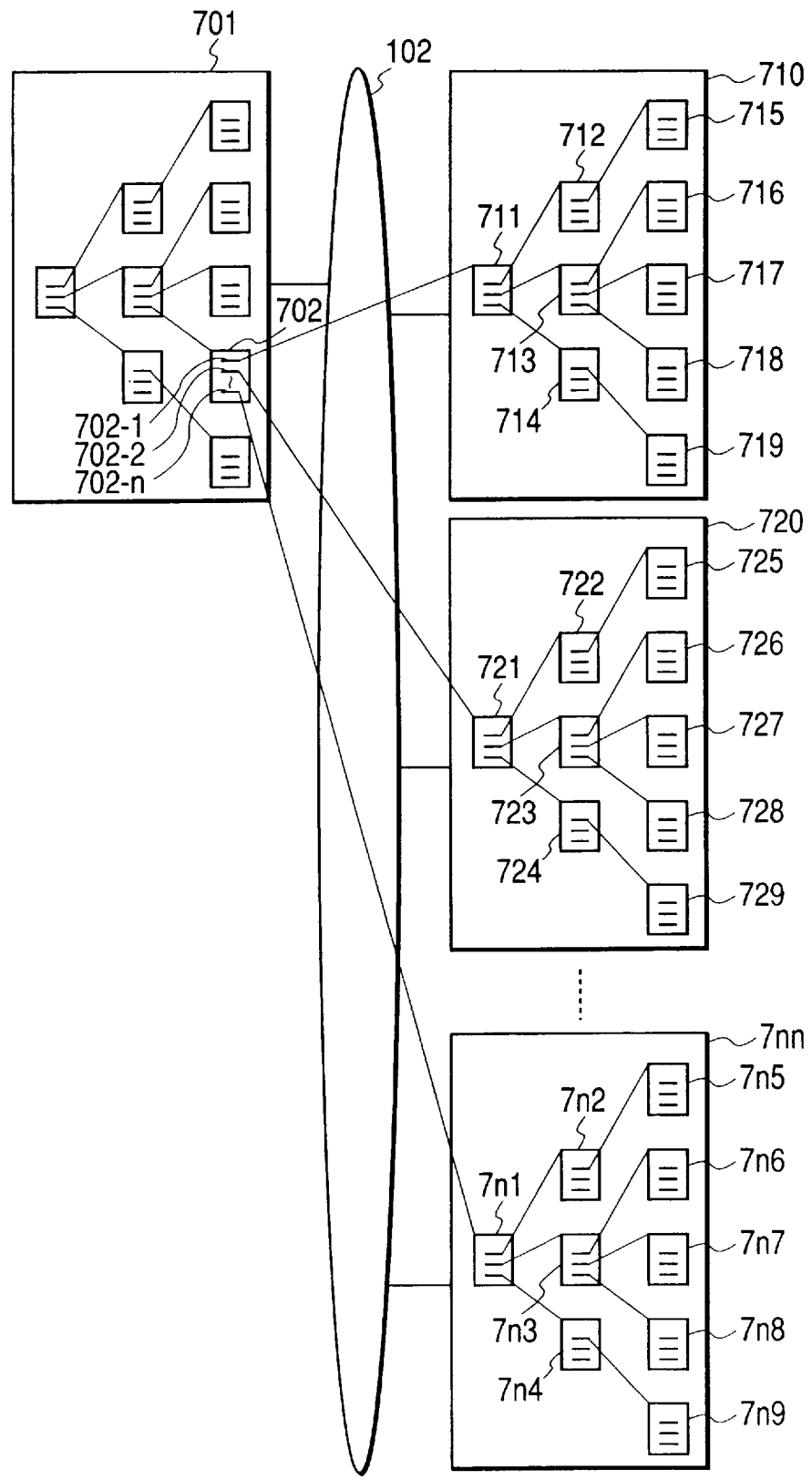
FIG. 7 is a diagram for explaining an example of the operation in an information search using the network information searching apparatus of FIG. 1.

Subsequently, a series of operations in case of searching the information which is needed by the user will now be described by using the network information searching apparatus 101 with reference to FIGS. 1 to 5 and 7. FIG. 7 is a diagram for explaining an example of the operation in the information search using the network information searching apparatus of FIG. 1. The series of operations will now be described with respect to an example in the case where the apparatus is connected to the network 102 at night when the network 102 is free, a series of WWW pages designated by the user is collected, the pages which are needed by the user are extracted from the collected pages, and the extracted pages are browsed in the daytime.

It is assumed that the information which is needed by the user, for example, the pages including the information regarding a printing device are a page 718 in a server 710 of A newspaper company and a page 7n4 in a server 7nn of N newspaper company and that a page of an index having a logical link to each newspaper company is a page 702 under the management of the WWW server 701 of CC Co. Ltd.

In this case, first, the user sets various information through the input means 104. In the access setting information, as shown in the access setting No. 1 in FIG. 3, a URL of the page 702 as a URL serving as a root is set to 3 as a hierarchical layer which traces the link. In case of storing the extracted information into a homepage and confirming, in the extraction condition setting information, as shown in the extraction condition No. 1 in FIG. 4, 1 is set into the access setting No. and the storage device (storage means 105 here) is set to the output destination, respectively. Further, for example, in case of setting so as to start the information collection means 1 at 3 a.m. when it is presumed that the network 102 and WWW server 701 will be free, as shown in FIG. 2, the start time in the environment information setting information is set to 3 a.m.

When the time of 3 a.m. comes, the information collection means 107 is started by the timer start means 106. The information collection means 107 refers to the access setting information held in the storage means 105, connects to the provider 111 through the public line 112, and connects to the network 102 via the provider 111. After it is connected to the network 102, first, the data at the page 702 under the management of the WWW server 701 of CC Co., Ltd. is collected. The information of the linked URL is extracted from the collected data. The data at pages 711 to 7n1 on the linked destination side is collected from the page 702 on the basis of the extracted link information. The information of the linked URL is extracted from those pages. By repeating the processes for collecting the page data of further lower hierarchical layers on the basis of the extracted link information, the data as much as four hierarchical layers is collected. After completion of the collection of the data, the connection to the provider 111 through the public line 112 is disconnected. The data collected by the information collection means 107 is held in the memory means 108.

The data corresponding to the information which is needed by the user is extracted by the extraction means 109. In the extracting process, with reference to the extraction condition setting information, the data held in the memory means 108 is discriminated to see whether a keyword of "printing device", a synonym, or an analogue is included in the whole text or not on a page unit basis. If there is a page including the keyword, synonym, or analogue, the data of this page is stored into the storage means 105.

After the data was stored, the user displays the data stored in the storage means 105 to display means (not shown) and confirms the contents of the data.

Figure 8:
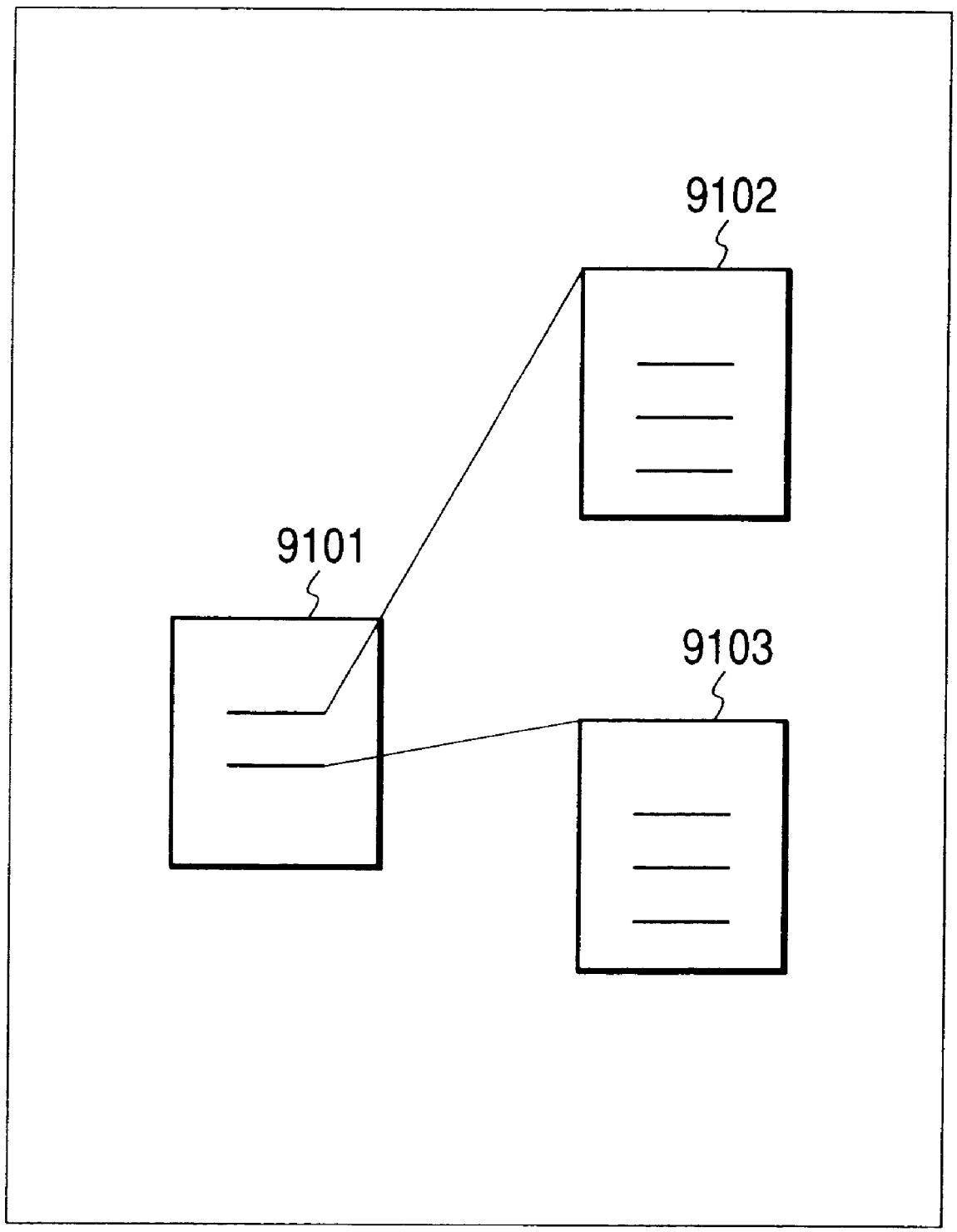
FIG. 8 is a diagram conceptually showing data stored in storage means in the network information searching apparatus of FIG. 1.

The data stored in the storage means 105 will now be described with reference to FIG. 8. FIG. 8 is a diagram conceptually showing the data stored in the storage means of the network information searching apparatus of FIG. 1.

As shown in FIG. 8, page data 9101, 9102, and 9103 extracted by the extracting process is stored in the storage means 105. The page data 9101 is the data of the page having index information of the extraction result. The page data 9102 is the data of the page corresponding to the page 718 shown in FIG. 7. The page data 9103 is the data of the page corresponding to the page 7n4 shown in FIG. 7. Therefore, it is sufficient for the user to confirm the page data

9102 and 9103. It will be understood that the work can be remarkably reduced as compared with a work to confirm the pages of the lower hierarchical layers in which the page 702 in FIG. 7 is the top hierarchy.

Figure 10:
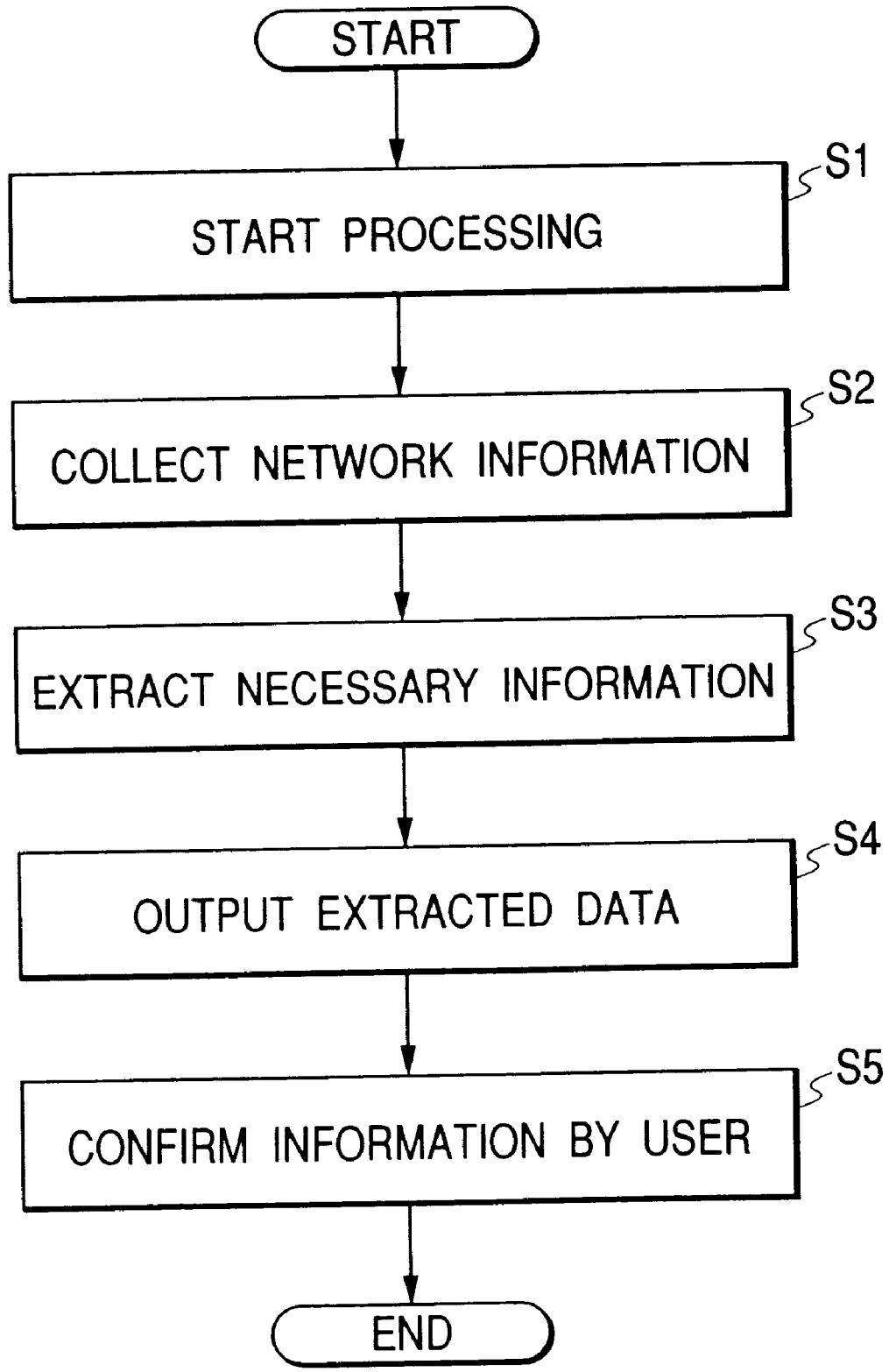
FIG. 10 is a flowchart showing a processing procedure in the network information searching apparatus of FIG. 1.

A processing procedure in the network information searching apparatus 101 will now be described with reference to FIG. 10. FIG. 10 is a flowchart showing a processing procedure in the network information searching apparatus of FIG. 1.

First, the processing routine is started in step S1. The "start" of the processing routine denotes that the information collecting process by the information collection means 107 is started. As a starting method, there is a start by the timer start means 106 or a start by the operation of the input means 104.

In step S2, the collecting process of the network information by the information collection means 107 is subsequently executed. In the collecting process, the data under the point serving as a root is collected up to the set hierarchical layer while repeating processes for collecting the data at a point serving as a certain root on the basis of the access setting information, extracting the link destination from the collected data, and further collecting the data on the extracted link destination. The "point serving as a root" here denotes a page shown by the URL in the WWW system, a directory of the file system in the file server system on the network, or a mail address in the mail system.

In step S3, the data which is needed by the user is extracted by the extraction means 109. The extraction condition which is used at the time of data extraction is held as extraction condition setting information in the storage means 105 as mentioned above. As an extracting method of the data, there is an extraction of data including the image set by the user, an extraction of data of the type set by the user, an extraction of data including the data set by the user, an extraction by the keyword set by the user, an extraction by the synonym of the keyword set by the user, or an extraction by the analogue of the keyword set by the user.

The extraction of data of the type set by the user denotes that, for example, in case of the data of the page under the management of the WWW system, only the data of the designated type is extracted from the page. As a type of data, there is text data, image data, audio data, or binary data.

The extraction of data including the data set by the user denotes that, for example, in a case of the data of the page under the management of the WWW system, all of the data of the page including the data of the designated type is extracted from the page, and that in case of the file, the file itself including the data of the designated type is extracted.

The extraction by the keyword, synonym of the keyword, or analogue of the keyword denotes that on the basis of the keyword and its synonym or analogue, the search is performed for the title of the data, file name, URL name, and the whole sentences of the text as targets, and the data including the keyword and its synonym or analogue is extracted. Whether the extracted data is congruous with the search condition or not is determined by designating by the user after the data was extracted.

In step S4, the extracted data is outputted. In the data output, the extracted data is outputted to the output destination designated by the output destination designation included in the extraction condition setting information. As an output destination, it is possible to set the storage means 105, printing device, display means, arbitrary FAX number, arbitrary mail address, or the like.

In step S5, the confirmation of the user for the outputted information is performed. The processing routine is finished.

(b) Second Embodiment

Figure 11:
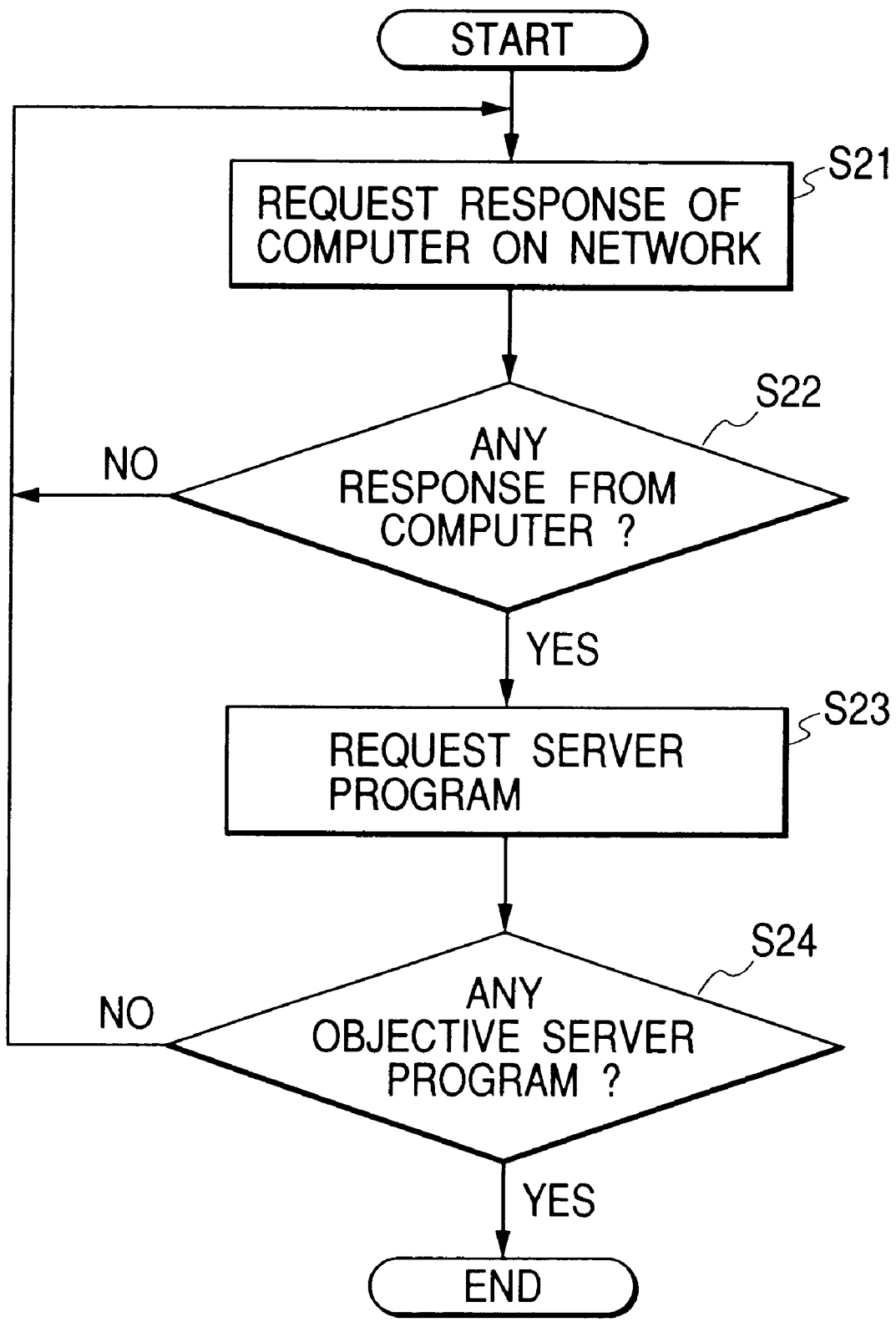
FIG. 11 is a flowchart showing a processing procedure for searching a server program which operates on a server computer on a network in the network information searching apparatus of FIG. 1.

In step S2 mentioned above, the process has been performed on the assumption of the case where the information such as server address, URL, or the like in which the point serving as a root exists has been set by the access setting information, namely, the case where the user knows the information of the server address, URL, or the like as a prerequisite. However, processes in the case where the user does not know such information will now be described with reference to FIG. 11. FIG. 11 is a flowchart showing a procedure for processes for searching a server program operating on the server computer on the network in the network information searching apparatus of FIG. 1.

First in step S21, a response request is issued to each of the server computers 103(m) on the network 102. In step S22, a check is made to see if there is a response to the response request from each server computer 103(m). If there is a response, step S23 follows and a request is issued to the server on the server computer 103(m) which responded. In step S24, a check is made to see if there is a response to the request from the corresponding server. If there is a response to the request from the corresponding server, the processing routine advances to a process to search the data which is needed by the user while using the server as a root. If the target data does not exist in the hierarchical data constructed under the dominant of the root, the processing routine is returned to step S21 and the process to search the next server is performed.

The order of the server computers 103(m) to generate the response request in step S21 is determined by preferentially using the method selected by the user among the well-known method of preferentially using the typical address, a method of preferentially using the address near the address of the user, and a method of accessing at random.

Figure 12:
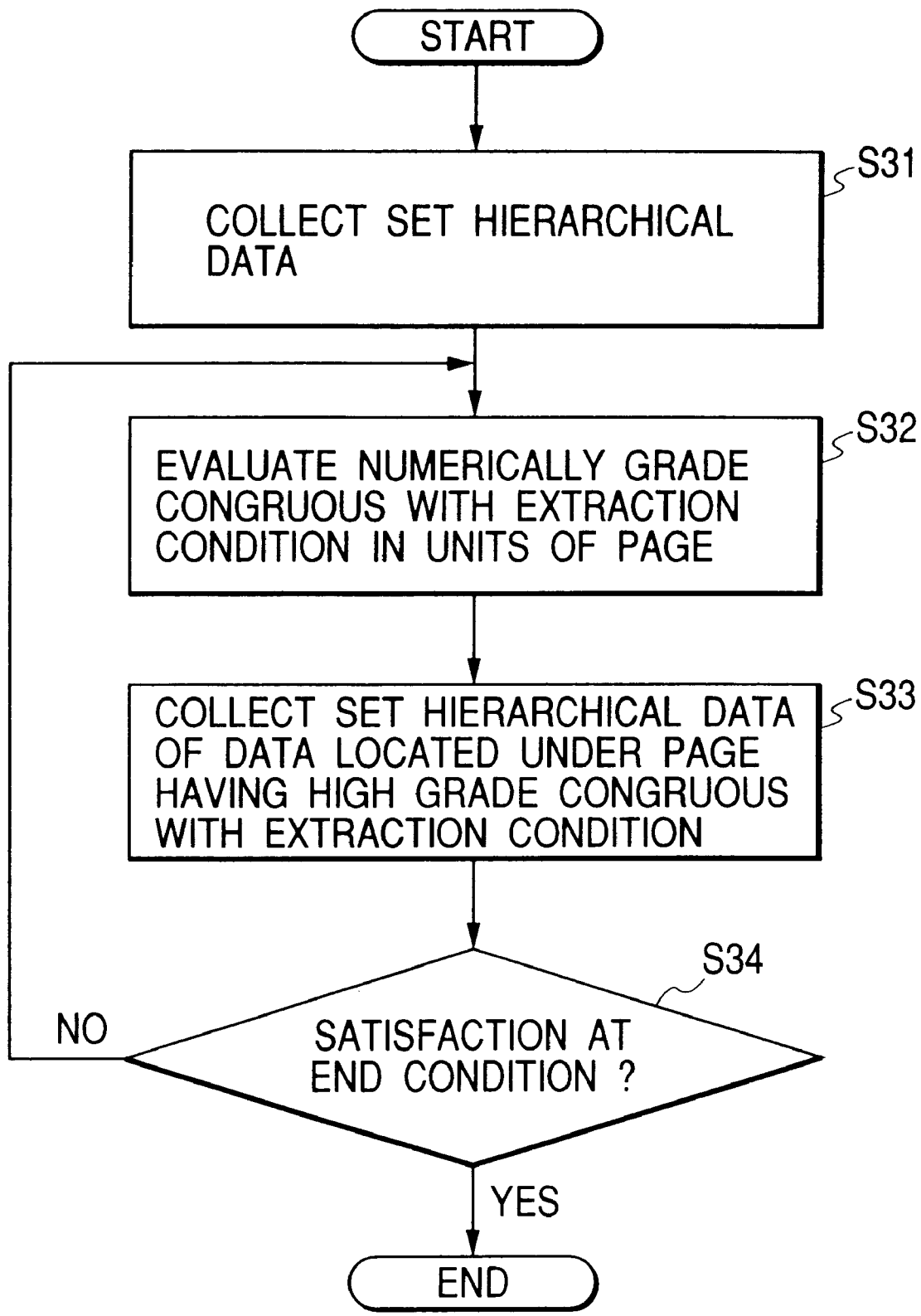
FIG. 12 is a flowchart showing a processing procedure in case of collecting information having directivity in the network information searching apparatus of FIG. 1.

(c) Third Embodiment:

In step S2, a processing procedure in case of collecting the information having directivity will now be described with reference to FIG. 12. FIG. 12 is a flowchart showing the processing procedure in case of collecting the information having directivity in the network information searching apparatus of FIG. 1.

First in step S31, the data as much as the hierarchical layers set in the access setting information is collected. In step S32, a grade congruous with the extraction condition is numerically evaluated.

In step S33, the hierarchical data of data located under the page having a high grade congruous with the extraction condition is collected by only an amount of the directivity collection hierarchical layers set in the access setting information. In step S34, a check is made to see if an end condition has been satisfied. If the end condition is not satisfied, the processing routine is returned to step S32. Processes from step S32 are repetitively executed by the end condition is satisfied. When the end condition is satisfied, the processing routine is finished.

Figure 9:
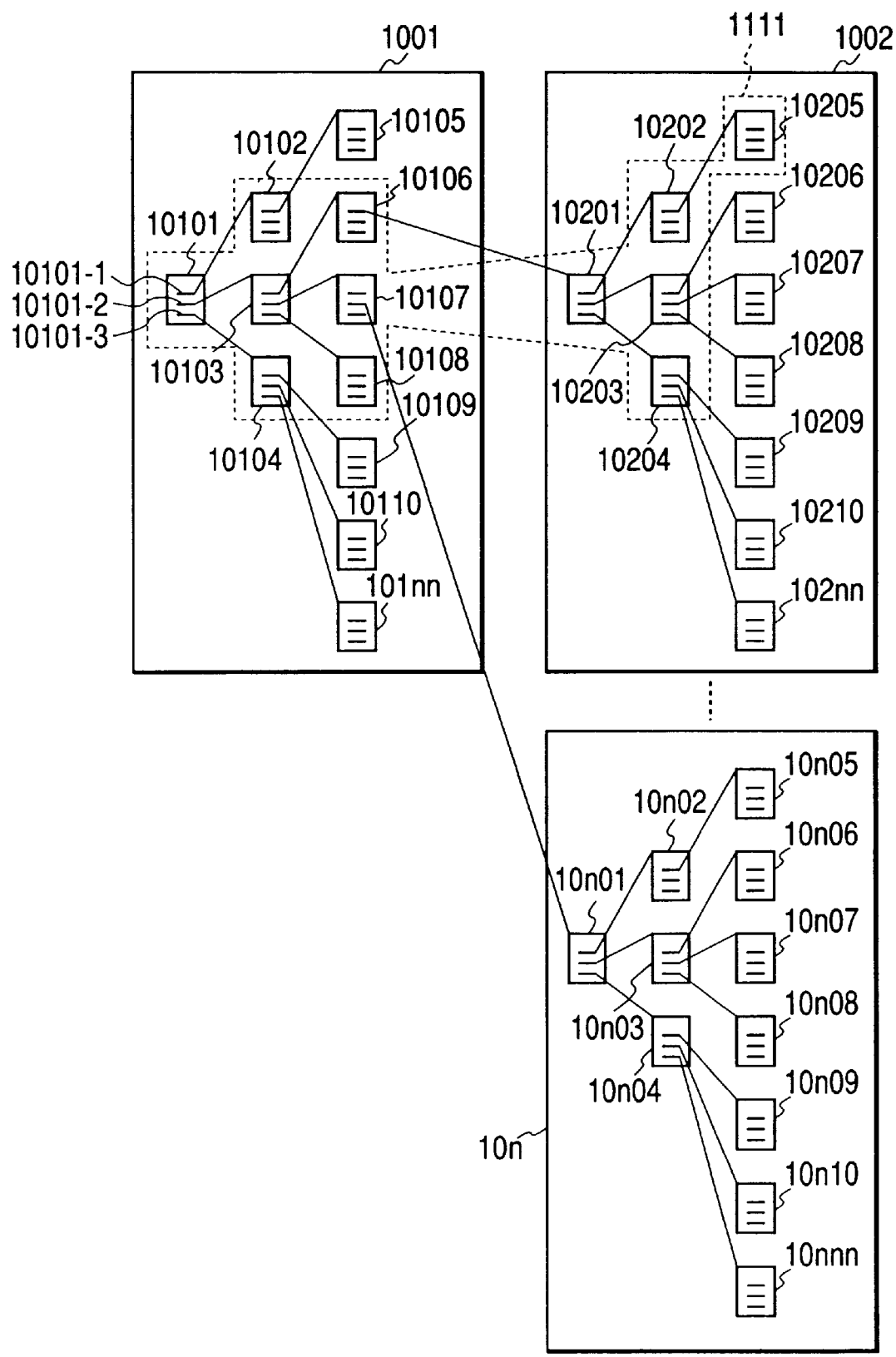
FIG. 9 is a diagram for explaining an example of a directivity data collection from a WWW system in the network information searching apparatus of FIG. 1.

The collection of the information having the directivity will now be described with reference to FIG. 9 with respect to an example in the case of collecting the data from the WWW system. FIG. 9 is a diagram for explaining an example of the directivity data collection from the WWW system in the network information searching apparatus of FIG. 1.

In FIG. 9, in the case where the hierarchical layer to collect the data in a lump is labelled as "1" while using a page 10101 as a root, first, the data of pages 10102 to 10104 of the hierarchical layers under the page 10101 is collected, a grade congruous with the extraction condition is numerically evaluated, and it is assumed that the page in which the congruous grade is the highest is the page 10103. In this instance, the data of pages 10106 to 10108 under the page 10103 is collected. Similar processes are repeated. When it is assumed that the pages in which the grade congruous with the extraction condition is high are the page 10106 among the pages 10106 to 10108 and a page 10202 among pages 10202 to 10204, the pages included in the range of a page 11111 to be collected are collected.

Figure 13:
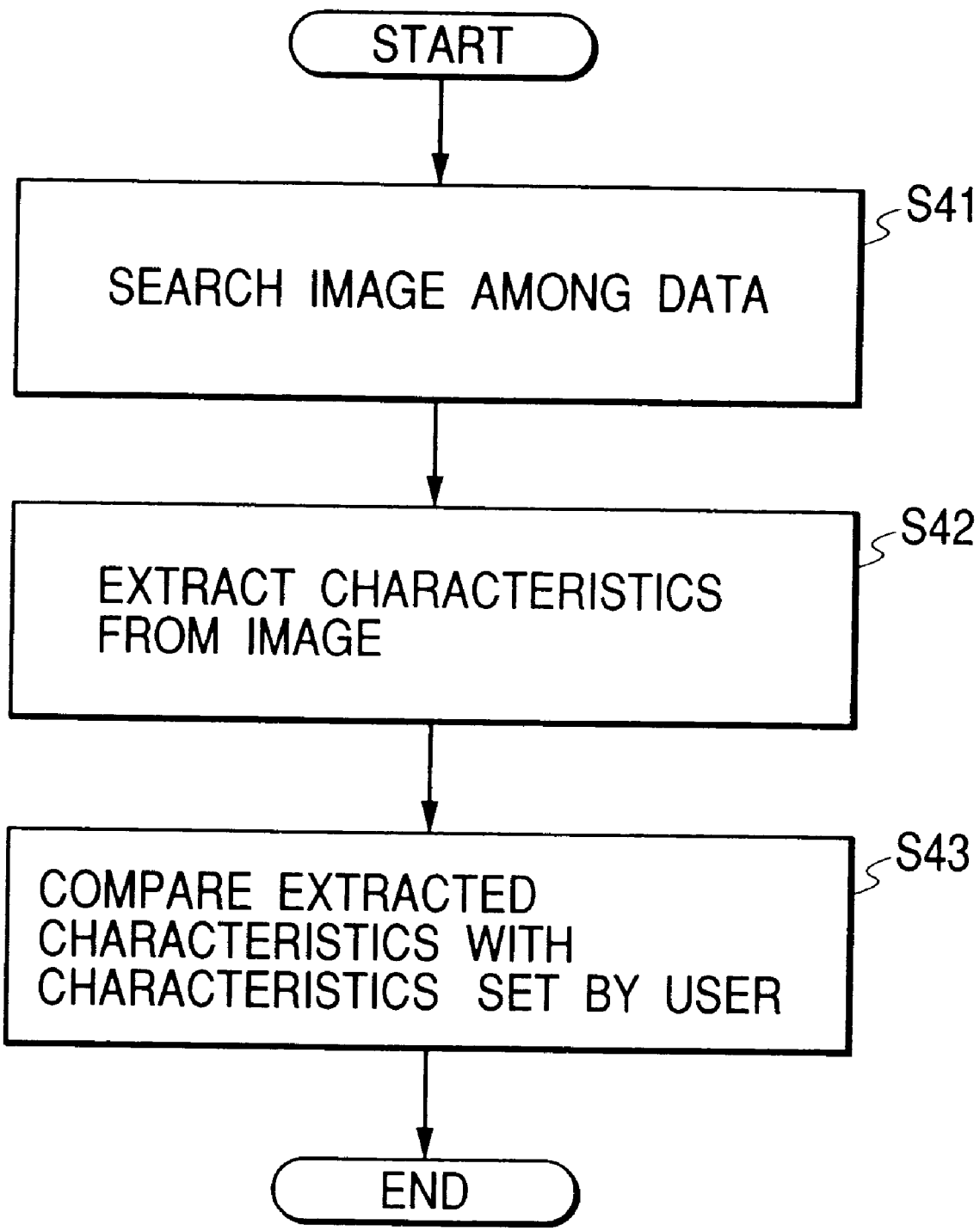
FIG. 13 is a flowchart showing a processing procedure for extracting image data having designated characteristics in the network information searching apparatus of FIG. 1.
Figure 14:
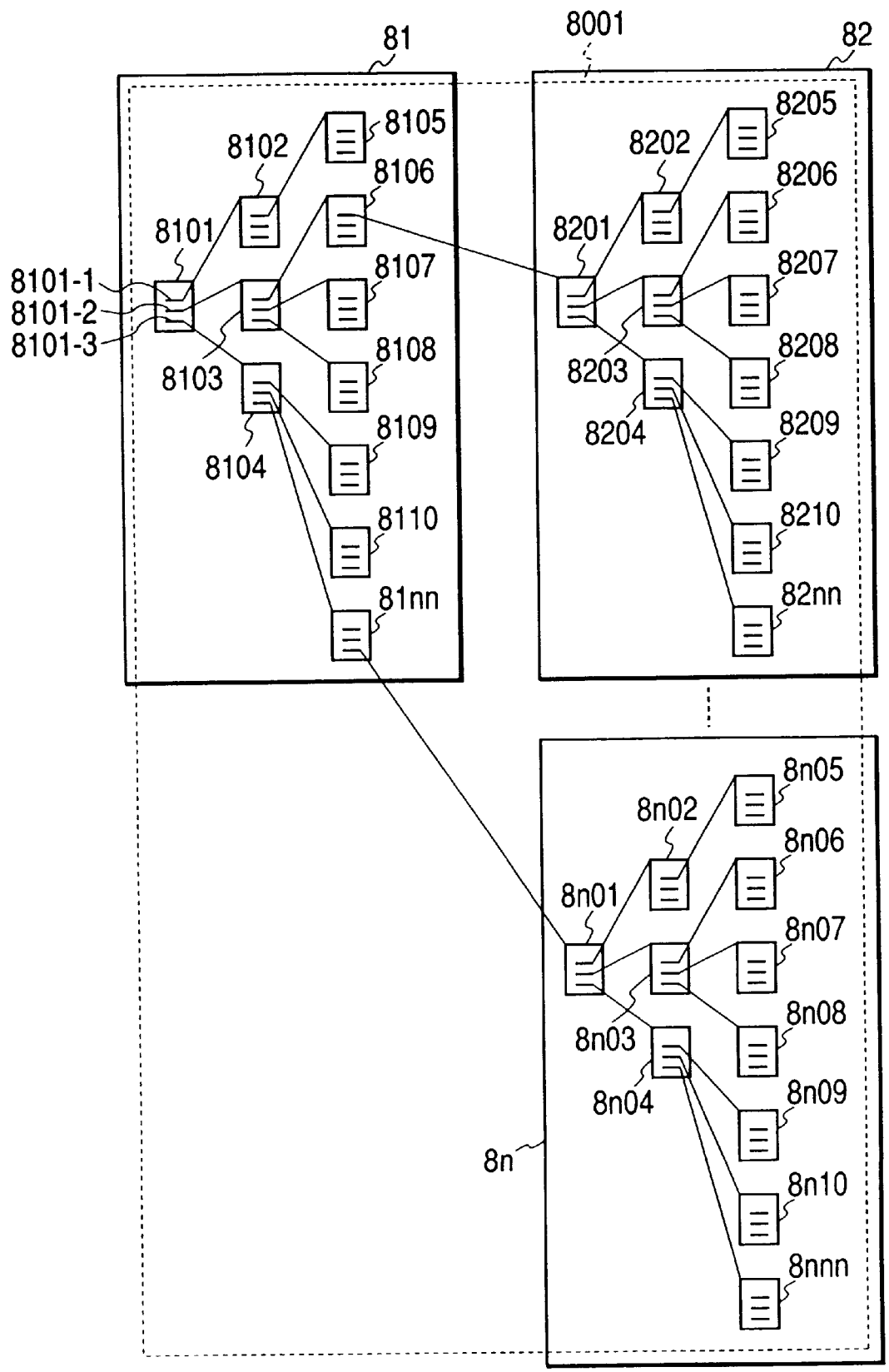
FIG. 14 is a diagram for explaining an operation example in case of searching necessary information from information managed by a conventional WWW system.

(d) Fourth Embodiment:

In step S3, the case of extracting the image data having the designated characteristics will now be described with reference to FIG. 13. FIG. 13 is a flowchart showing a processing procedure for extracting the image data having designated characteristics in the network information searching apparatus of FIG. 1.

First in step S41, the image data is extracted from the information collected in step S2 (shown in FIG. 10). In step S42, characteristics of the extracted image data are extracted. In step S43, by comparing the extracted characteristics of the image with the image extraction information (shown in FIG. 6) set by the user, the image data having the characteristics of the image data which is needed by the user is extracted.

As characteristics of the image which is set by the user, there are an outline and a color such as human object, house, or the like solely having certain characteristics in case of an outline, scenery characteristics such as mountain, plain, sea, four seasons, or the like in case of a scene, and the like.

As mentioned above, in the network information searching apparatus 101, the data held by the server system of each server computer 103(m) is collected through the network 102. The data corresponding to the data required by the user is extracted from the collected data. The extracted data is outputted to the set output destination. Therefore, the data which is needed by the user can be searched from the data managed and held by the server system of each of the server computers 103(m) on the network 102 without forcing surplus labor and time to the user.

Data can be automatically collected in a time zone when the network is free, the communication time can be reduced, and the communication costs can be reduced.

Further, since the extracted data is outputted to the designated output destination, for example, it is possible to easily set a mode to print and output the pages which are seen everyday by a predetermined time in the morning, a mode to output them as a mail to himself, a mode to transmit them to an FAX apparatus of a predetermined address, or the like. The extracted information can be confirmed in a desired output form of the user.

In the embodiment, although the example in which the network information searching apparatus 101 is constructed as a single apparatus has been shown, the network information searching apparatus 101 can be also constructed by a personal computer. In this case, there is used a personal computer comprising at least: a keyboard or a mouse constructing the input means 104; a display; an external memory device such as hard disk or the like constructing the storage means 105 or memory means 108; and an interface to connect to the provider 111 through the public line. A network information searching program including an information collecting module constructing the information collection means 107, an information holding module for holding the collected data into the external memory device, an extracting module constructing the extraction means 109, and an output module constructing the output means 110 is stored in the external memory device. By reading out and executing the network information searching program as necessary, the network information searching apparatus is constructed. The network information searching program is supplied by a memory medium such as FD (floppy disk), CD-ROM, or the like.

As described above, according to the first to fourth embodiments, the information which is required by the user can be searched from the information managed and held by the information processing program of a plurality of information processing apparatuses on the network without forcing surplus labor and time to the user.

The data can be automatically collected in a time zone when the network is free, the communication time can be reduced, and the communication costs can be decreased.

It is also possible to easily connect to the information processing apparatus in which the connection is permitted from a plurality of information processing apparatuses on the network.

The information required by the user can be properly extracted.

It is possible to easily set the mode to print and output the pages which are seen everyday by a predetermined time, the mode to output them as a mail to himself, the mode to transmit them to the FAX apparatus of a predetermined address, or the like. The extracted information can be confirmed in a desired output form of the user can be confirmed.

What is claimed is:

1. A network information searching apparatus which is connected through a network to a plurality of information processing apparatus on the network and is used to search information required by the user from information stored in each memory means in each of said information processing apparatuses, comprising:

information collection means for collecting the information stored in each of said memory means through said network by preferentially collecting information which is concerned with the information required by said user at a predetermined probability;

information holding means for holding the information collected by said information collection means;

extraction means for extracting information corresponding to the information required by said user from the information held in said information holding means; and output means for outputting the information extracted by said extraction means and corresponding to the information required by said user.

2. An apparatus according to claim 1, further comprising timer start means for starting said information collection means at a start time set by said user.

3. An apparatus according to claim 1, wherein said information collection means has detection means for detecting an address of the information processing apparatus in which a connection is permitted for said user among said information processing apparatuses and an information management system of said address.

4. An apparatus according to claim 1, wherein each of said memory means is controlled by an information management program.

5. A network apparatus according to claim 4, wherein information management program is a World Wide Web server program for a file server program for a file server system.

6. An apparatus according to claim 1, wherein when the information required by said user is image data, said extraction means extracts image data from the information held in said information holding means, extracts characteristics of said extracted image data, compares said extracted image data with characteristics of the image data required by said user, and extracts image data corresponding to the image data required by said user in accordance with a result of said comparison.

7. An apparatus according to claim 1, wherein said extraction means analyzes a data type of the information held in said information holding means, compares a result of said analysis with a data type of the information required by said user, and extracts information corresponding to the information required by said user in accordance with a result of said comparison.

8. An apparatus according to claim 1, wherein said extraction means analyzes a data type of the information held in said information holding means, compares a result of said analysis with a data type of the information required by said user, and extracts information including information of a data type corresponding to the data type of the information required by said user in accordance with a result of said comparison.

9. An apparatus according to claim 1, wherein said extraction means analyzes an attribute of the information held in said information holding means, compares a result of said analysis with an attribute of the information required by said user, and extracts information corresponding to the information required by said user in accordance with a result of said comparison.

10. An apparatus according to claim 1, wherein said extraction means performs a search to the information held in said information holding means on the basis of a keyword included in a text portion of said information and a synonym or an analogue of said keyword and extracts information corresponding to the information required by said user by said search.

11. An apparatus according to claim 1, wherein said extraction means extracts information corresponding to the information required by said user and forms an index of information concerned in an extracting step of said extracted information, and said output means outputs said index formed together with the information extracted by said extraction means.

12. An apparatus according to claim 1, wherein said output means outputs said extracted information to an apparatus which can output said extracted information in a desired output form of said user in accordance with a selection of said user.

13. A network information searching method of a network information apparatus which is connected through a network to a plurality of information processing apparatuses on the network and is used to search information required by the user from information stored in each memory means in each of said information processing apparatuses, comprising:

an information collecting step of collecting the information stored in each of said memory means through said network by preferentially collecting information which is concerned with the information required by said user at a predetermined probability;

an information holding step of holding said collected information into information holding means;

an extracting step of extracting information corresponding to the information required by said user from the information held in said information holding means; and an output step of outputting said extracted information corresponding to the information required by said user.

14. A method according to claim 13, further comprising a step of instructing so as to start the collection of the information stored in each of said memory means at a start time set by said user.

15. A method according to claim 13, wherein each of said memory means is controlled by an information management program.

16. A method according to claim 15, wherein said information management program is a World Wide Web server program or a file server program for a file server system.

17. A method according to claim 13, wherein in said extracting step, when the information required by said user is image data, image data is extracted from the information held in said information holding means, characteristics of said extracted image data are extracted, said extracted image data is compared with characteristics of the image data required by said user, and image data corresponding to the image data required by said user is extracted in accordance with a result of said comparison.

18. A method according to claim 13, wherein in said extracting step, a data type of the information held in said information holding means is analyzed, a result of said analysis is compared with a data type of the information required by said user, and information corresponding to the information required by said user is extracted in accordance with a result of said comparison.

19. A method according to claim 13, wherein in said extracting step, a data type of the information held in said information holding means is analyzed, a result of said analysis is compared with a data type of the information required by said user, and information including information of a data type corresponding to the data type of the information required by said user is extracted in accordance with a result of said comparison.

20. A method according to claim 13, wherein in said extracting step, an attribute of the information held in said information holding means is analyzed, a result of said analysis is compared with an attribute of the information required by said user, and information corresponding to the information required by said user is extracted in accordance with a result of said comparison.

21. A method according to claim 13, wherein in said extracting step, a search is executed to the information held in said information holding means on the basis of a keyword included in a text portion of said information and a synonym or an analogue of said keyword and information corresponding to the information required by said user by said search is extracted.

22. A method according to claim 13, wherein in said extracting step, information corresponding to the information required by said user is extracted and an index of information concerned in an extracting step of said extracted information is formed, and in said output step, said formed index is outputted together with the information extracted by said extracting step.

23. A method according to claim 13, wherein in said output step, said extracted information is outputted to an apparatus which can output said extracted information in a desired output form of said user in accordance with a selection of said user.

24. A storage medium which is connected through a network to a plurality of information processing apparatuses on the network and in which a network information searching program to search information required by the user from information stored in each memory means in each of said information processing apparatuses has been stored, wherein said network information searching program comprises:
  an information collection module for collecting the information stored in each of said memory means through said network by preferentially collecting information which is concerned with the information required by said user at a predetermined probability;
  information holding module for holding said collected information collection holding means;
  an extracting module for extracting information corresponding to the information required by said user from the information held in said information holding means; and
  an output module for outputting said extracted information corresponding to the information required by said user.

25. A network information searching system constructed by a plurality of information processing apparatuses and a network information searching apparatus which are mutually connected through a network,
  wherein said network information searching apparatus comprises:
    information collection means for collecting information stored in each memory means in each of said information processing apparatuses through said network by preferentially collecting information which is concerned with the information required by a user at a predetermined probability;
    information holding means for holding the information collected by said information collection means;
    extraction means for extracting information corresponding to the information required by said user from the information held in said information holding means; and
    output means for outputting the information extraction by said extraction means and corresponding to the information required by said user.

26. A network information searching apparatus which is connected a network to a plurality of information processing apparatuses on the network and is used to search information required by the user from information stored in each memory means in each of said information processing apparatuses, comprising:
  information collection means for collecting the information stored in each of said memory means through said network;
  information holding means for holding the information collected by said information collection means;
  extraction means for extracting information corresponding to the information required by said user from the information held in said information holding means; and
  output means for outputting the information extracted by said extraction means and corresponding to the information required by said user,
  wherein when the information required by said user is image data, said extraction means extracts image data from the information held in said information holding means, extracts characteristics of said extracted image data, compares said extracted image data with characteristics of the image data required by said extracts image date corresponding to the image data required by said user in accordance with a result of said comparison.

27. A network information searching apparatus which is connected through a network to a plurality of information processing apparatuses on the network and is used to search information required by the user from information stored in each memory means in each of said information processing apparatuses, comprising:
  information collection means for collecting the information stored in each of said memory means through said network;
  information holding means for holding the information collected by said information collection means;
  extraction means for extracting information corresponding to the information required by said user from the information held in said information holding means; and
  output means for outputting the information extracted by said extraction means and corresponding to the information required by said user,
  wherein said extraction means analyzes a data type of the information held in said information holding means, compares a result of said analysis with a data type of the information required by said user, and extracts information corresponding to the information required by said user in accordance with a result of said comparison.

28. A network information searching apparatus which is connected through a network to a plurality of information processing apparatuses on the network and is used to search information required by the user from information stored in each memory means in each of said information processing apparatuses, comprising:
  information collection means for collecting the information stored in each of said memory means through said network;
  information holding means for holding the information collected by said information collection means;
  extraction means for extracting information corresponding to the information required by said user from the information held in said information holding means; and
  output means for outputting the information extracted by said extraction means and corresponding to the information required by said user,
  wherein said extraction means analyzes a data type of the information held in said information holding means, compares a result of said analysis with a data type of the information required by said user, and extracts information including information of a date type corresponding to the data type of the information required by said user in accordance with a result of said comparison.

29. A network information searching method of a network information searching apparatus which is connected through a network to a plurality of information processing apparatuses on the network and is used to search information required by the user from information stored in each memory means in each of said information processing apparatuses, comprising:
  an information collecting step of collecting the information stored in each of said memory means through said network;
  an information holding step of holding said collected information into information holding means;
  an extracting step of extracting information corresponding to the information required by said user from the information held in said information holding means; and an output step of outputting said extracted information corresponding to the information required by said user, wherein in said extracting step, when the information required by said user is image data, image data is extracted from the information held in said information holding means, characteristics of said extracted image data are extracted said extracted image data compared with characteristics of the image data required by said user, and image data corresponding to the image data required by said user is extracted in accordance with a result of said comparison.

30. A network information searching method of a network information searching apparatus which is connected through a network to a plurality of information processing apparatuses on the network and is used to search information required by the user from information stored in each memory means in each of said information processing apparatuses, comprising:

an information collecting step of collecting the information stored in each of said memory means through said network;

an information holding step of holding said collected information into information holding means;

an extracting step of extracting information corresponding to the information required by said user from the information held in said information holding means; and an output step of outputting said extracted information corresponding to the information required by said user, wherein in said extracting step, a data type of the information held in said information holding means is analyzed, a result of said analysis is compared with a data type of the information required by said user, and information corresponding to the information required by said user is extracted in accordance with a result of said comparison.

31. A network information searching method of a network information searching apparatus which is connected through a network to a plurality of processing apparatuses on the network and is used to search information required by the user from information stored in each memory means in each of said information processing apparatuses, comprising:

an information collecting step of collecting the information stored in each of said memory means through said network;

an information holding step of holding said collected information into information holding means;

an extracting step of extracting information corresponding to the information required by said user from the information held in said information holding means; and an output step of outputting said extracted information corresponding to the information required by said user, wherein in said extracting step, a data type of the information held in said information holding means is analyzed, a result of said analysis is compared with a data type of the information required by said user, and information including information of a data type corresponding to the data type of the information required by said user is extracted in accordance with a result of said comparison.

32. A storage medium which is connected through a network to a plurality of information processing apparatuses on the network and in which a network information searching program to search information required by the user from information stored in each memory means in each of said information processing apparatuses has been stored, wherein said network information searching program comprises:

an information collecting module for collecting the information stored in each of said memory means through said network;

an information holding module for holding said collected information into information holding means;

an extracting module for extracting information corresponding to the information required by said user from the information held in said information holding means; and an output module for outputting said extracted information corresponding to the information required by said user, wherein when the information required by said user is image data, said extraction module extracts image data from the information held in said information holding means, extracts characteristics of said extracted image date, compares said extracted image data with characteristics of the image data required by said user, and extracts image data corresponding to the image data required by said user in accordance with a result of said comparison.

33. A storage medium which is connected through a network to a plurality of information processing apparatuses on the network and in which a network information searching program to search information required by the user from information stored in each memory means in each of said information processing apparatuses has been stored, wherein said network information searching program comprises:

an information collecting module for collecting the information stored in each of said memory means through said network;

an information holding module for holding said collected information into information holding means;

an extracting module for extracting information corresponding to the information required by said user from the information held in said information holding means; and an output module for outputting said extracted information corresponding to the information required by said user, wherein said extraction module analyzes a data type of the information held in said information holding means, compares a result of said analysis with a data type of the information required by said user, and extracts information corresponding to the information required by said user in accordance with a result of said comparison.

34. A storage medium which is connected through a network to a plurality of information processing apparatuses on the network and in which a network information searching program to search information required by the user from information stored in each memory means in each of said information processing apparatuses has been stored, wherein said network information searching program comprises:

an information collecting module for collecting the information stored in each of said memory means through said network;

an information holding module for holding said collected information into information holding means;

an extracting module for extracting information corresponding to the information required by said user from the information held in said information holding means; and an output module for outputting said extracted information corresponding to the information required by said user, wherein said extraction module analyzes a data type of the information held in said information holding means, compares a result of said analysis with a data type of the information required by said user, and extracts information including information of a data type corresponding to the data type of the information required by said user in accordance with a result of said comparison.

35. A network information searching system constructed by a plurality of information processing apparatuses and a network information searching apparatus which are mutually connected through a network, wherein said network information searching apparatus comprises:

information collection means for collecting information stored in each memory means in each of said information processing apparatuses through said network;

information holding means for holding the information collected by said information collection means;

extraction means for extracting information corresponding to the information required by said user from the information held in said information holding means; and output means for outputting the information extracted by said extraction means and corresponding to the information required by said user, wherein when the information required by said user is image data, said extraction means extracts image data from the information held in said information holding means, extracts characteristics of said extracted image data, compares said extracted image data with characteristics of the image data required by said user, and extracts image data corresponding to the image data required by said user in accordance with a result of said comparison.

36. A network information searching system constructed by a plurality of information processing apparatuses and a network information searching apparatus which are mutually connected through a network, wherein said network information searching apparatus comprises:

information collection means for collecting information stored in each memory means in each of said information processing apparatuses through said network;

information holding means for holding the information collected by said information collection means;

extraction means for extracting information corresponding to the information required by a user from the information held in said information holding means; and output means for outputting the information extracted by said extraction means and corresponding to the information required by said user, wherein said extraction means analyzes a data type of the information held in said information holding means, compares a result of said analysis with a data type of the information required by said user, and extracts information corresponding to the information required by said user in accordance with a result of said comparison.

37. A network information searching system constructed by a plurality of information processing apparatuses and a network information searching apparatus which are mutually connected through a network, wherein said network information searching apparatus comprises:

information collection means for collecting information stored in each memory means in each of said information processing apparatuses through said network; information holding means for holding the information collected by said information collection means;

extraction means for extracting information corresponding to the information required by a user from the information held in said information holding means; and output means for outputting the information extracted by said extraction means and corresponding to the information required by said user, wherein said extraction means analyzes a data type of the information held in said information holding means, compares a result of said analysis with a data type of the information required by said user, and extracts information including information of a data type corresponding to the data type of the information required by said user in accordance with a result of said comparison.

* * * * *

UNITED STATES PATENT AND TRADEMARK OFFICE
CERTIFICATE OF CORRECTION

PATENT NO. : 6,163,804
DATED : December 19, 2000
INVENTOR(S) : Hiroshi Matusi

It is certified that error appears in the above-identified patent and that said Letters Patent is hereby corrected as shown below:

Column 1,
Line 50, "case" should read -- a case --.

Column 2,
Line 21, "to" should read -- of --;
Line 22, "of" should read -- to --; and
Line 54, "holing" should read -- holding --.

Column 4,
Line 52, "everyday," should read -- every day, --.

Column 6,
Line 18, "case" should read -- a case --.

Column 10,
Line 27-28, "can be confirmed" should be deleted.
Line 33, "apparatus" should read -- apparatuses --; and
Line 65, "information" should read -- the information --.

Column 13,
Line 8, "information" should read -- an information --;
Line 9, "collection holding means" should read -- by said information collection module --;
Line 35, "extraction" should read -- extracted --;
Line 39, "connected" should read -- connected through --;
Line 62, "extracts" should read -- extracted --; and
Line 63, "date" should read -- data --.

Column 14,
Line 47, "date" should read -- data --.

Column 15,
Line 7, "extracted said" should read -- extracted, said --; and
Line 40, "processing" should read -- information processing --.

UNITED STATES PATENT AND TRADEMARK OFFICE
CERTIFICATE OF CORRECTION

PATENT NO.    : 6,163,804
DATED         : December 19, 2000
INVENTOR(S)   : Hiroshi Matusi It is certified that error appears in the above-identified patent and that said Letters Patent is hereby corrected as shown below:

<u>Column 18,</u>
Line 29, "information" should read -- ¶ information --.

Signed and Sealed this

Fifth Day of February, 2002

Attest:

JAMES E. ROGAN
*Attesting Officer*     *Director of the United States Patent and Trademark Office*